United States Patent [19]

Takeuchi et al.

[11] 4,392,879

[45] Jul. 12, 1983

[54] METHOD OF FORMING GLASS FIBERS WHILE MONITORING A PROCESS CONDITION IN A SPINNER

[75] Inventors: Kunthiko Takeuchi, Newark; James S. Belt, Utica, both of Ohio

[73] Assignee: Owens-Corning Fiberglas Corporation, Toledo, Ohio

[21] Appl. No.: 413,920

[22] Filed: Sep. 1, 1982

Related U.S. Application Data

[63] Continuation-in-part of Ser. No. 304,775, Sep. 23, 1981, abandoned.

[51] Int. Cl.³ ............................................. C03B 37/04
[52] U.S. Cl. ............................................. 65/6; 65/8; 65/14; 65/15; 65/29; 65/161; 65/162
[58] Field of Search ...................... 65/5, 6, 8, 14, 15, 65/29, 160, 161, 162

[56] References Cited

U.S. PATENT DOCUMENTS 3,395,005  7/1968  Stelmah .................. 65/14 X
4,150,358  4/1979  Aviander .................. 340/189 M
4,167,403  9/1979  Coggin .................... 65/29 X

OTHER PUBLICATIONS

Acurex Sales Brochure: Model 155k Wireless Data Coupling Receiver; Acurex Corp. Autodata Division 8/78.
Acurex Sales Brochure Model 2190 Wireless Data Coupling Thermocouple Transmitter; Acurex Corp., Autodata Division 4/78.

Primary Examiner—Robert L. Lindsay, Jr.
Attorney, Agent, or Firm—Ronald C. Hudgens; Philip R. Cloutier; Ted C. Gillespie

[57] ABSTRACT

The method and apparatus for monitoring a process condition in a spinner mounted for rotation, the spinner having an orificed sidewall for the centrifuging of molten mineral material therethrough, comprises a sensing means mounted for rotation with the spinner for sensing a process condition, and a wireless transmitter mounted for rotation with the spinner for transmitting a signal responsive to the sensed process condition.

17 Claims, 5 Drawing Figures

METHOD OF FORMING GLASS FIBERS WHILE MONITORING A PROCESS CONDITION IN A SPINNER

This application is a continuation-in-part of Ser. No. 304,775, filed 9/23/1981, now abandoned.

TECHNICAL FIELD

This invention pertains to the manufacture of mineral fibers from molten mineral material, such as forming glass fibers from molten glass for insulation products. In one of its more specific aspects, this invention relates to monitoring a process condition on the spinner during the manufacturing process.

BACKGROUND OF THE INVENTION

A common practice in forming fibers of mineral material, such as glass, is to discharge molten glass from a forehearth into a rotating centrifuge or spinner. The molten glass flows across the spinner bottom wall to the spinner sidewall and passes in a molten state through the orifices of the spinner sidewall to create primary fibers. Thereafter, the primary fibers can be further attenuated into a veil of secondary fibers of smaller diameter by the action of a downward flow of gases from an annular blower. Hot gases from an annular burner maintain the spinner sidewall at a temperature suitable for centrifuging the glass. The hot gases from the burner also maintain the primary fibers emanating from the spinner in a plastic state to enable further attenuation into secondary fibers. The fiber forming process is regulated by controlling the various process variables, such as the temperature or volume of hot gases from the burner, the pressure of the air from the blower, the molten glass temperature and viscosity, and the rotation rate of the spinner.

One of the problems associated with operating glass fiber forming operations is the inability to accurately assess process conditions, such as the spinner wall temperature, molten glass thickness on the interior of the spinner wall, and air pressure at the spinner wall, under the extreme conditions associated with forming fibers from molten glass. It is extremely difficult, for example, to accurately monitor the temperature of the spinner sidewall during operation. The measurement of the temperature profile of the spinner sidewall is important because the sidewall temperature determines, in part, fiber diameters and other fiber qualities.

Attempts to assess the temperature profile of the spinner sidewall, bottom wall, and top flange have not been entirely successful. The spinner temperature profile is further complicated by the fact that the hot gases from the burner are mixed with the relatively cool gases from the blower and the cool air induced by the blower to form a complex temperature profile pattern. The spinner itself is rotating at a rate of over 2000 r.p.m., and the sidewall temperature is in the vicinity of 1700° F. (925° C.) or higher. Attempts to position thermocouples or other process monitoring devices on the spinner itself have not been successful due to the extreme environmental conditions in which the spinner operates, and the inability to effectively transmit data from a sensing device to a non-rotating control apparatus. An optical pyrometer has also been used, but this has provided only obscure and unusable results. There is a need for means for more accurately assessing temperature profiles on rotating spinners. There is also a need for an improved ability to monitor other process conditions on rotating spinners.

SUMMARY OF THE INVENTION

According to this invention, there is provided a method for the manufacture of mineral fibers comprising supplying molten mineral material to the interior of a spinner having an orificed sidewall, and rotating the spinner to cause the molten mineral material to pass through the sidewall orifices to form mineral fibers, where the improvement comprises monitoring a process condition with a sensing means, the sensing means being mounted for rotation with the spinner, and transmitting a signal from a wireless transmitter mounted for rotation with the spinner to a receiver spaced apart from the transmitter, the signal being responsive to the sensed process condition.

In a preferred embodiment of the invention, the receiver is a non-rotating receiver.

Another embodiment of the invention comprises controlling a process variable responsive to the signal.

In another embodiment of the invention, the monitoring step comprises sensing the temperature at a locus on the spinner sidewall, bottom wall or top flange.

In yet another embodiment of the invention, the monitoring step comprises sensing the air pressure at a locus on the spinner sidewall, bottom wall or top flange.

In still another embodiment of the invention, the thickness of the molten mineral material on the interior of the spinner sidewall is sensed.

According to this invention, there is also provided apparatus for the manufacture of mineral fibers including a spinner mounted for rotation, the spinner having an orificed sidewall for centrifuging molten mineral material therethrough, where the improvement comprises a sensing means mounted for rotation with the spinner for sensing a process condition, a wireless transmitter mounted for rotation with the spinner for transmitting a signal responsive to the sensed process condition, and a receiver spaced apart from the transmitter for receiving the signal.

In a preferred embodiment of the invention, the receiver is a non-rotatable receiver.

Another embodiment of the invention comprises means for regulating a process variable and means for controlling the regulating means in response to the signal.

In a specific embodiment of the invention, the process variable is the heat supplied to the spinner sidewall by a burner, and the regulating means comprises a valve for regulating the flow rate of an air/fuel mixture being supplied to the burner.

In another embodiment of the invention, the sensing means is adapted to sense the temperature at a locus on the spinner sidewall.

In yet another embodiment of the invention, the sensing means is adapted to sense the temperature at a locus on the spinner bottom wall.

In still another embodiment of the invention, the sensing means is adapted to sense the temperature at a locus on the spinner top flange.

In a specific embodiment of the invention, the sensing means is adapted to sense the air pressure at a locus on the spinner sidewall, bottom wall or top flange.

In a specific embodiment of the invention, the sensing means is adapted to sense the thickness of the molten mineral material on the interior of the spinner sidewall.

In a preferred embodiment of the invention, a non-rotatable protective jacket is mounted to surround the transmitter and the non-rotatable receiver.

DESCRIPTION OF THE INVENTION

The invention will be described in terms of a glass fiber-forming operation, although it is to be understood that the invention can be practiced using other heat-softenable mineral material such as rock, slag, and basalt. Also, the invention is described in terms of monitoring the temperature as the process condition, although it is to be understood that other process conditions such as air pressure and the thickness of molten glass on the interior of the spinner wall can be monitored.

Figure 1:
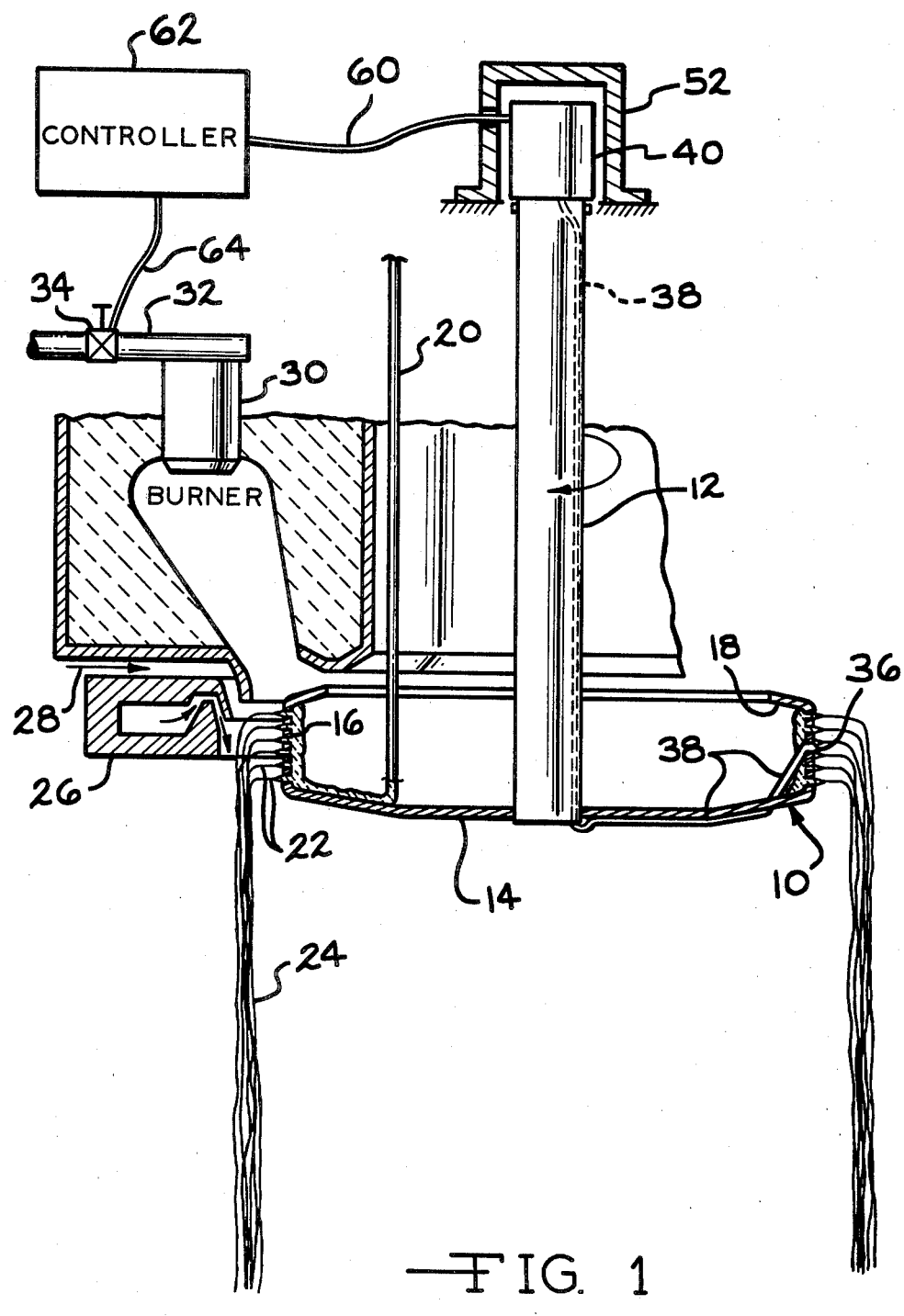
FIG. 1 is a schematic cross section in elevation of apparatus for forming mineral fibers according to the principles of this invention.

As shown in FIG. 1, the spinner 10 is mounted for rotation on quill 12 and can be comprised of spinner bottom wall 14, sidewall 16, and top flange 18. The spinner sidewall contains numerous orifices through which molten glass 20 passes to form primary fibers 22. The primary fibers can be further attenuated into secondary fibers 24 by the flow of air from annular blower 26. The downward flow of air from the blower causes an induced air flow, as shown by arrow 28. The spinner sidewall can be maintained at a temperature sufficient for fiberizing molten glass by annular burner 30, which can be supplied with an air/gas mixture via supply line 32 regulated by valve 34.

Thermocouple 36 can be positioned in the spinner sidewall for monitoring the temperature process condition at the spinner sidewall. Alternatively, the thermocouple can be positioned in the spinner bottom wall or the spinner top flange. Also, a plurality of thermocouples can be employed to monitor the temperature at various loci on the spinner. The thermocouple is connected by lead wires 38 which are passed through the spinner bottom wall and threaded up through the hollow spinner quill to the transmitter, hereinafter disclosed. Preferably, the lead wires are encased in ceramic insulation to protect them from molten glass and the hot fiber forming environment.

Figure 2:
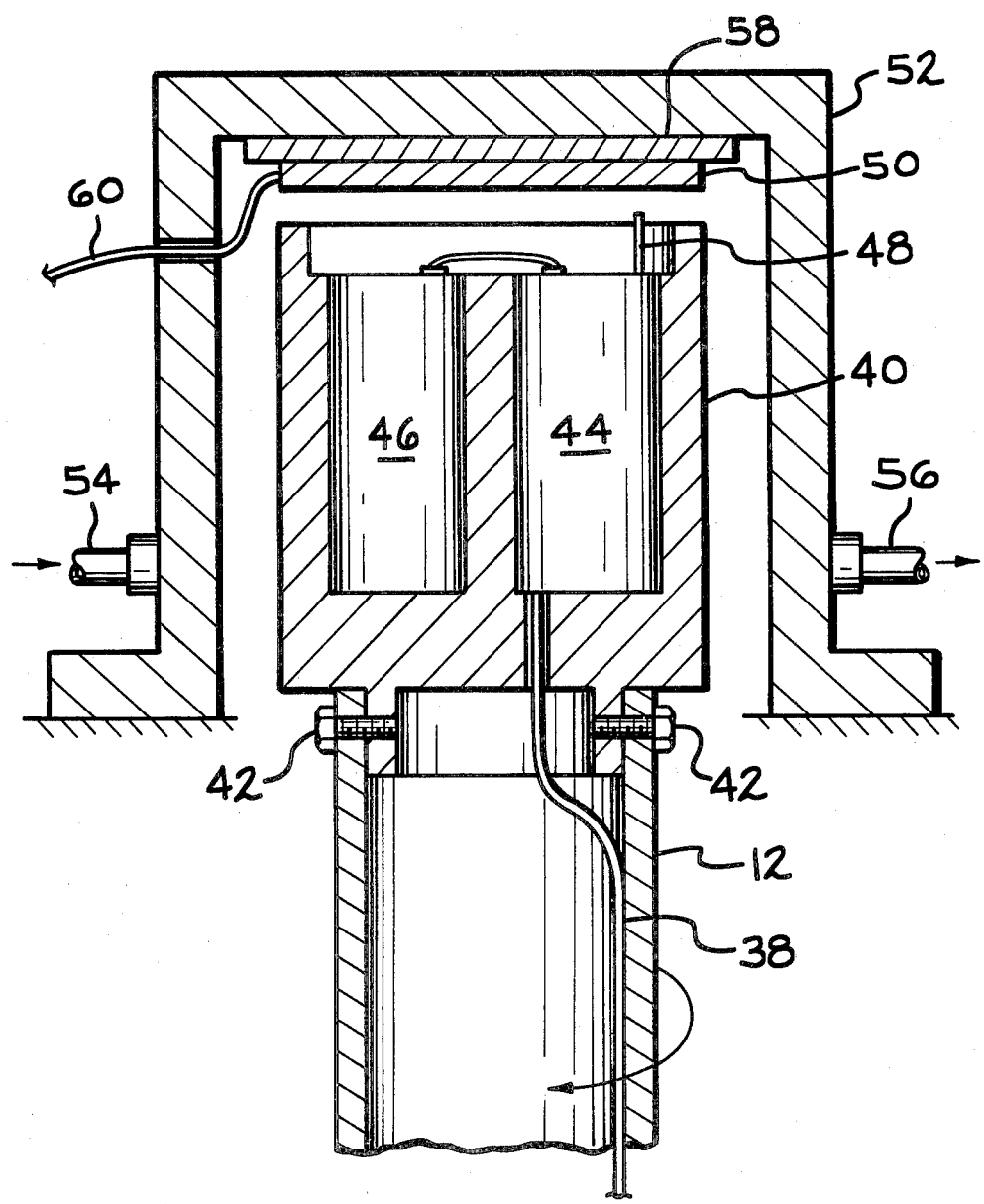
FIG. 2 is a schematic cross section in elevation illustrating in greater detail the transmitter and receiver of the apparatus shown in FIG. 1.

As shown in FIG. 2, transmitter housing 40 is secured by screws 42 to the upper portion of the quill. Positioned within the transmitter housing are transmitter 44 and battery 46, which powers the transmitter. The transmitter can be any device suitable for transmitting a signal responsive to the temperature sensed by the thermocouple. The type of signal which can be employed in operation of the invention can be any signal utilizing a wireless transmission through the free space from the transmitter to a receiver. Thus, the transmission can be via any type of electro-magnetic wave signal, including radio waves, microwave and light signals, either visible or invisible. The transmitter must also be capable of operating under the hostile fiber forming environment. An Acurex Autodata wireless data coupling thermocouple transmitter, model 219Q has been found to be suitable. Since the transmitter and the spinner are both secured to the quill, the transmitter will always be rotating in exact conformance with the rotation of the spinner. The transmitter can be adapted with transmitting antenna 48 which also rotates in conformance with the spinner. The transmitter must be wireless because it must transmit from a rotating position or environment at the top of the quill to a receiving means, and, eventually, a controller, which are not rotating with the spinner.

Receiving antenna 50 is spaced apart from and can be positioned directly above the transmitting antenna to receive the signal transmitted by the wireless transmitter. The receiving antenna is not mounted for rotation, and it can be any receiver suitable for receiving the signal in the hostile fiber forming environment. An Acurex Autodata wireless coupling receiver, model 155K, has been found to be suitable. The transmitter and the receiving antenna can be surrounded by non-rotating protective jacket 52 in order to protect them from the hostile fiber-forming environment. The protective jacket can be adapted with flow passages, not shown, and inlet 54 and outlet 56 to enable the passage of a cooling fluid therethrough, and thereby provide a more protective environment for the transmitter and receiving antenna. Preferably, the receiving antenna is separated from the protective jacket by a suitable electrical insulator such as insulator 54.

The receiving antenna can be connected by receiving lead wire 60 to controller 62, such as a digital computer. The controller can be equipped with a receiver, a de-multiplexer and a readout and data logging device. The controller can be adapted to control a means for regulating a process variable. For example, a controller can be connected via burner valve control line 64 to the valve on the air/gas supply line which, in turn, controls the burner and therefore the process variable of the heat supplied to the spinner sidewall. Thus, the process variable is controlled responsive to the signal sent from the rotating transmitter. Alternatively, the means for regulating the process variable can be an instrument which controls the air/gas ratio in the air/gas mixture.

Figure 3:
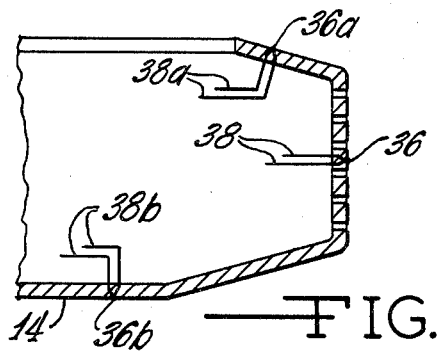
FIG. 3 is a schematic cross section in elevation of a portion of a fiber forming spinner illustrating alternate placements of thermocouples.

As shown in FIG. 3, the thermocouples can be positioned at alternative loci. For example, thermocouple 36a connected to the transmitter via wires 38a can be mounted on the spinner top flange. Alternatively, thermocouple 36b, connected to the transmitter by wires 38b, can be positioned on the spinner bottom wall.

Figure 4:
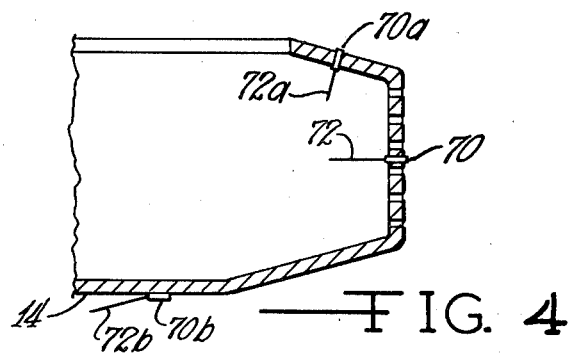
FIG. 4 is a schematic cross section in elevation of a fiber forming spinner illustrating the positioning of pressure sensors on the spinner.

The invention also comprises the sensing of air pressure or atmospheric pressure by a pressure sensor mounted on the spinner sidewall, top flange or bottom wall. For example, pressure sensor 70, which can be a piezoelectric sensor, can be positioned in the spinner sidewall, as shown in FIG. 4. Wire connections 72 can connect the pressure sensor with the transmitter. Alternatively, pressure sensor 70a, connected to the transmitter by connection 72a, can be employed to monitor pressure at the spinner top flange. Also, pressure sensor 70b positioned at the spinner bottom wall, and connected to the transmitter via connection 72b, can be employed to monitor pressure on the spinner bottom wall.

Figure 5:
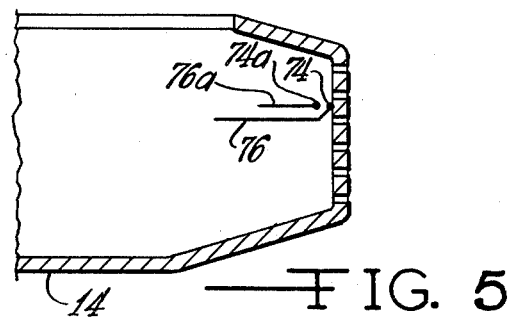
FIG. 5 is a schematic cross section in elevation of a fiber forming spinner illustrating the positioning of means for sensing the thickness of molten glass on the interior of the spinner sidewall.

This invention also comprises the sensing of the head or thickness of the molten glass on the interior of the spinner sidewall. For example, a glass thickness measuring means, such as electrodes 74 and 74a, shown in FIG. 5, can be employed to sense the thickness of the head of molten glass on the spinner sidewall. The electrodes can be connected to the transmitter by connectors 76 and 76a to permit a closed electrical circuit when the head of the glass reaches electrodes 74a.

It will be evident from the foregoing that various modifications can be made to this invention. Such, however, are considered as being within the scope of the invention.

INDUSTRIAL APPLICABILITY

This invention will be found to be useful in the formation of fibers from molten glass for such uses as glass fiber thermal insulation products and glass fiber acoustical insulation products.

We claim:

1. The method for the manufacture of mineral fibers comprising supplying molten mineral material to the interior of a spinner having an orificed sidewall, and rotating said spinner to cause said molten mineral material to pass through the sidewall orifices to form mineral fibers, wherein the improvement comprises monitoring a process condition with a sensing means, said sensing means being mounted for rotation with said spinner, and transmitting a signal from a wireless transmitter mounted for rotation with said spinner to a receiver spaced apart from said transmitter, said signal being responsive to the sensed process condition.

2. The method of claim 1 in which said receiver is a non-rotating receiver.

3. The method of claim 2 comprising controlling a process variable responsive to said signal.

4. The method of claim 2 in which said monitoring step comprises sensing the temperature at a locus on the spinner sidewall, bottom wall or top flange.

5. The method of claim 2 in which said monitoring step comprises the air pressure at a locus on the spinner sidewall, bottom wall or top flange.

6. The method of claim 2 comprising sensing the thickness of the molten mineral material on the interior of said spinner sidewall.

7. In apparatus for the manufacture of mineral fibers including a spinner mounted for rotation, said spinner having an orificed sidewall for the centrifuging of molten mineral material therethrough, the improvement comprising a sensing means mounted for rotation with said spinner for sensing a process condition, a wireless transmitter mounted for rotation with said spinner for transmitting a signal responsive to the sensed process condition, and a receiver spaced apart from said transmitter for receiving said signal.

8. The apparatus of claim 7 in which said receiver is a non-rotatable receiver.

9. The apparatus of claim 8 comprising means for regulating a process variable and means for controlling said means for regulating responsive to said signal.

10. The apparatus of claim 9 in which said process variable is the heat supplied to said spinner sidewall by a burner, and said means for regulating comprises a valve for regulating the flow rate of an air/fuel mixture being supplied to said burner.

11. The apparatus of claim 8, in which said sensing means is adapted to sense the temperature at a locus on said spinner sidewall.

12. The apparatus of claim 8, in which said sensing means is adapted to sense the temperature at a locus on the spinner bottom wall.

13. The apparatus of claim 8, in which said sensing means is adapted to sense the temperature at a locus on the spinner top flange.

14. The apparatus of claim 8 in which said sensing means is adapted to sense the air pressure at a locus on the spinner sidewall, bottom wall, or top flange.

15. The apparatus of claim 8 in which said sensing means is adapted to sense the thickness of the molten mineral material on the interior of said spinner sidewall.

16. The apparatus of claim 8 comprising a non-rotatable protective jacket mounted to surround said transmitter and said non-rotatable receiver.

17. In apparatus for the manufacture of mineral fibers including a spinner mounted for rotation, said spinner having an orificed sidewall for the centrifuging of molten mineral material therethrough, and further including a burner for supplying heat to said spinner sidewall, the improvement comprising a thermocouple mounted on said spinner sidewall for rotation with said spinner, a wireless transmitter mounted for rotation with said spinner for transmitting a signal responsive to the temperature sensed by said thermocouple, a non-rotating receiver spaced apart from said transmitter for receiving said signal, and a controller for controlling the heat supplied to said spinner sidewall by said burner, said controller being responsive to the signal received by said receiver.

* * * * *